United States Patent [19]
Johnson et al.

[11] Patent Number: 5,848,674
[45] Date of Patent: Dec. 15, 1998

[54] BRAKE DISK

[75] Inventors: Korey Johnson, West Allis; George H. Hinkens, Fox Point; Glenn S. Metzelfeld, Brookfield, all of Wis.

[73] Assignee: Hayes Brake, Inc., Mequon, Wis.

[21] Appl. No.: 22,178

[22] Filed: Feb. 11, 1998

Related U.S. Application Data

[63] Continuation of Ser. No. 555,293, Nov. 8, 1995.

[51] Int. Cl.⁶ .................................................... B62L 11/14
[52] U.S. Cl. .................................. 188/18 A; 188/218 XL
[58] Field of Search .......................... 188/18 A, 218 XL, 188/71.5, 251 M, 18 R, 234; 192/70.13, 70.14, 107 R, 107 M

[56] References Cited

U.S. PATENT DOCUMENTS

| | | |
|---|---|---|
| 2,191,460 | 2/1940 | Fisher ................................ 188/218 XL |
| 3,301,356 | 1/1967 | Pompa ............................. 188/218 XL |
| 3,435,924 | 4/1969 | Beuchle ........................... 188/218 XL |
| 3,621,945 | 11/1971 | Spry . |
| 3,850,267 | 11/1974 | Odier . |
| 4,077,501 | 3/1978 | Morris .................................... 188/18 A |
| 4,093,043 | 6/1978 | Smith . |
| 4,273,218 | 6/1981 | Morris et al. . |
| 4,848,521 | 7/1989 | Izumine ............................ 188/218 XL |
| 4,913,267 | 4/1990 | Campbell et al. ................ 188/218 XL |
| 5,632,362 | 5/1997 | Leitner .............................. 188/218 XL |

OTHER PUBLICATIONS

Honda Shadow American Classic Edition, Motorcyclist, Jan. 1995, pp. 39–43.

*Primary Examiner*—Lee W. Young
*Attorney, Agent, or Firm*—Nilles & Nilles, S.C.

[57] ABSTRACT

A disk brake assembly having a friction disk mounted on the hub of a motorcycle wheel, the friction disk having an inner hub and an outer ring interengaged by a plurality of equally spaced offset arms connecting the outer ring to the inner hub. The angle of each arm being such that the heat generated in the outer ring causes the outer end of the arms to expand in relation to the expansion of the outer ring and to contract on cooling to return the outer ring to its original position.

13 Claims, 4 Drawing Sheets

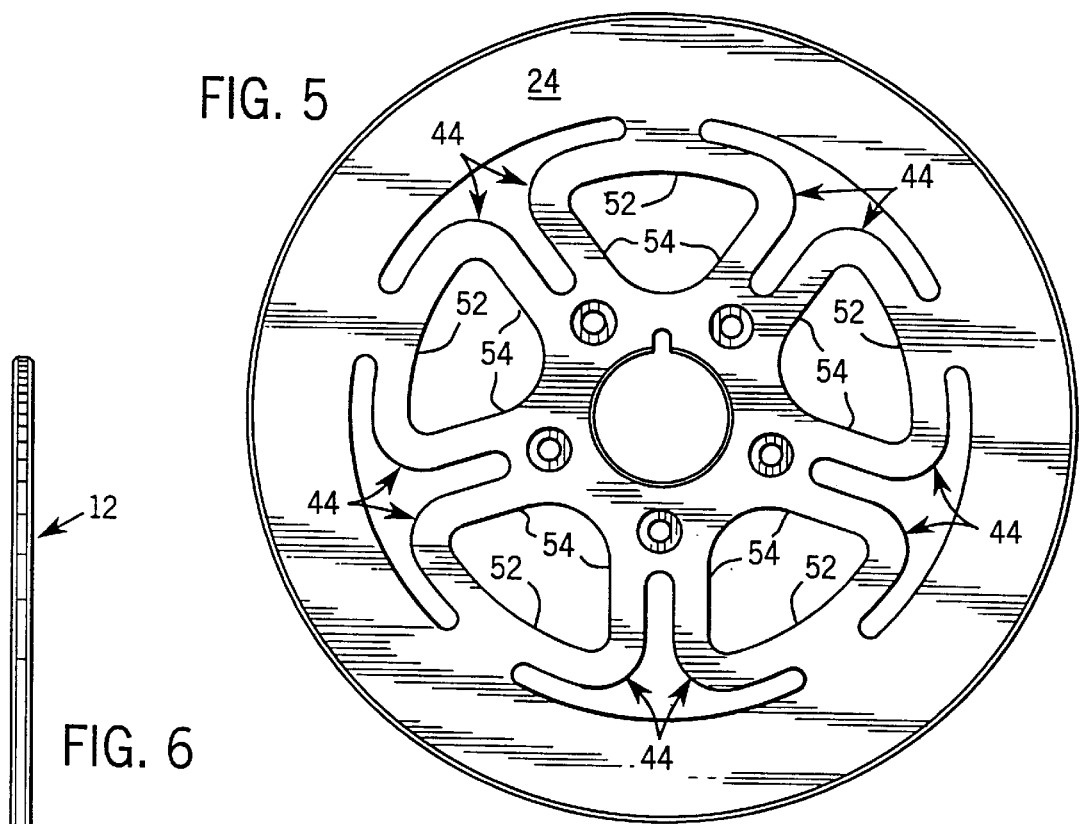
FIG. 5
FIG. 6
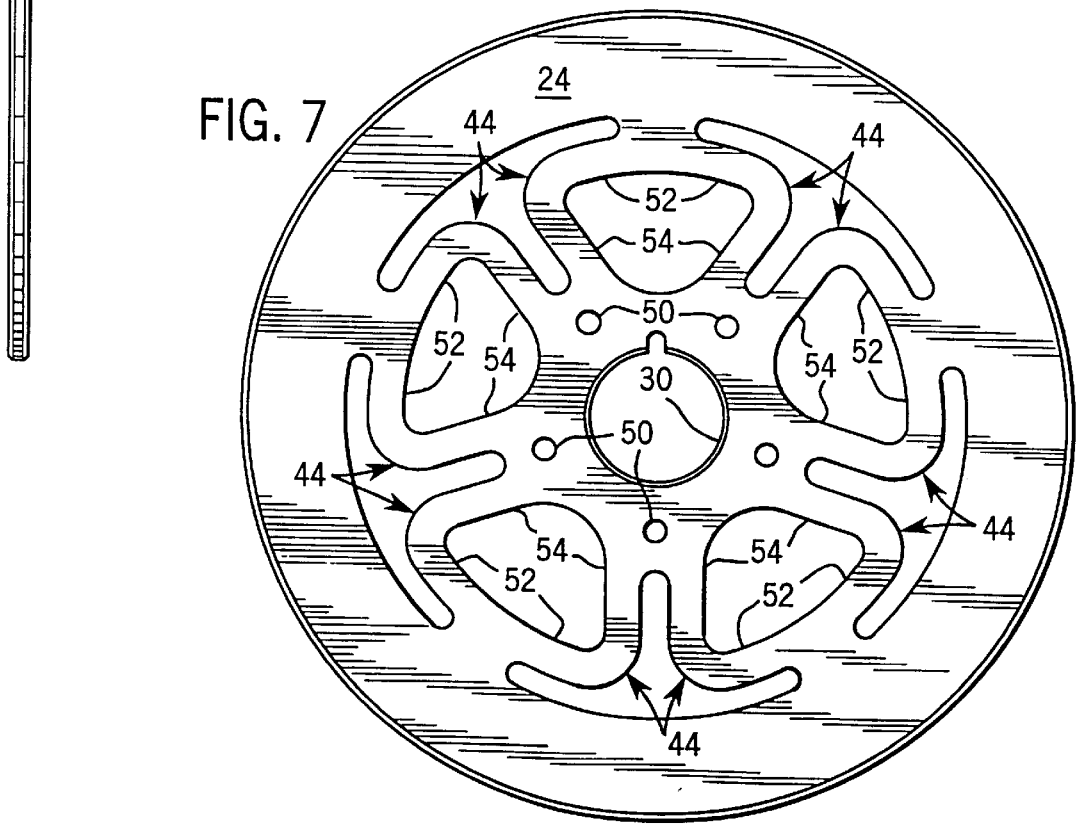
FIG. 7

BRAKE DISK

RELATED U.S. APPLICATION DATA

This is a continuation application of U.S. patent application Ser. No. 08/555,293, filed on Nov. 8, 1995, the complete application thereof being incorporated herein by reference.

FIELD OF THE INVENTION

The present invention relates to a brake assembly for a motorcycle and more particularly to a brake disk having concentric rings interconnected by a number of heat responsive flexible arms to allow the outer ring to expand radially outwardly from the center of the disk.

BACKGROUND OF THE INVENTION

Solid one piece brake disks are generally used on motorcycles, however, the disks tend to warp due to the variation in temperature from the center of the disk to the outer edge of the disk. Currently floating rotors are used to eliminate warpage but are expensive due to the number of parts and assembly costs.

Brake disks, whether rotary or stationary, must be capable of withstanding and absorbing or conducting the heat created by the friction of the brake pads when closed on the outer perimeter of the brake disk. Since the heat generated by the brake pads is restricted to the outer perimeter of the disk, the outer perimeter of the disk expands while the inner section of the disk is subject to little if any heat. If a large disparity in temperature between the inner and outer areas of the disk occurs the outer heated section of the disk expands, causing the disk to warp. If the caliper is a fixed mount caliper, as opposed to a slide mount caliper, a warping disk pushes on the pads and pistons on one side of the disk which will cause a loss of braking efficiency.

In U.S. Pat. No. 3,621,945, issued Nov. 23, 1971, entitled, "Disc Brakes," carbon friction discs for aircraft brakes, are provided with scalloped perimeters for coaction with driving or restraining elements having similar scalloped perimeters. Both sets of scallops have flat contact surfaces disposed at an angle which optimizes the distribution of force on the friction disc and reduces or eliminates the transfer of heat from the outer rim to the inner rim. In U.S. Pat. No. 3,850,267, issued Nov. 26, 1974, entitled, "Heat Collector And Support For Disc Brakes," a heat-collector shoe is arranged in a guide support which permits movement of the heat-collected shoe perpendicularly to the rotating member. The heat-collector shoe and the rotating member can be improved by providing the contact surface of the heat-collector shoe with shallow grooves and the circulation of cooling fluid through internal conduits in the collector shoe body. In U.S. Pat. No. 4,077,501, issued Mar. 7, 1978, entitled, "Disc for Disc Brake Unit," slots are provided in the brake segments which allow for radial expansion and contraction, thereby eliminating cracking by thermal expansion and contraction of the disc.

In view of the foregoing, it would be desirable to provide a brake disk, particularly of the type stamped from a nonductile material such as stainless steel which reduces the tendency of the disk to develop cracks and fractures due to expansion and contraction of the disk.

It would also be desirable to reduce the tendency of the disk to warp by allowing the outer ring to expand when heated by braking, without this flexibility, the disk when heated enough will warp when cooled.

SUMMARY OF THE PRESENT INVENTION

The present invention provides a brake disk having an inner ring and an outer ring interconnected by a number of spaced arms. The arms can be formed (e.g. stamped) in a number of configurations whereby the stress in the disk caused by the heat generated in the outer ring by the brake caliper is relieved by the expansion and contraction of the arms, thus preventing warping of the disk. The present invention also provides a braking system which incorporates such a disk.

Features and advantages of the invention will become apparent to those skilled in the art upon review of the following drawings, the detailed description and the appended claims.

BRIEF DESCRIPTION OF THE DRAWINGS

FIG. 5 is a side view of the disk shown in FIG. 4 with the outer rim connected to the inner rim by triangularly shaped arms;

FIG. 6 is an end view of the disk; and

FIG. 7 is a view of the back side of the disk.

Figure 1:
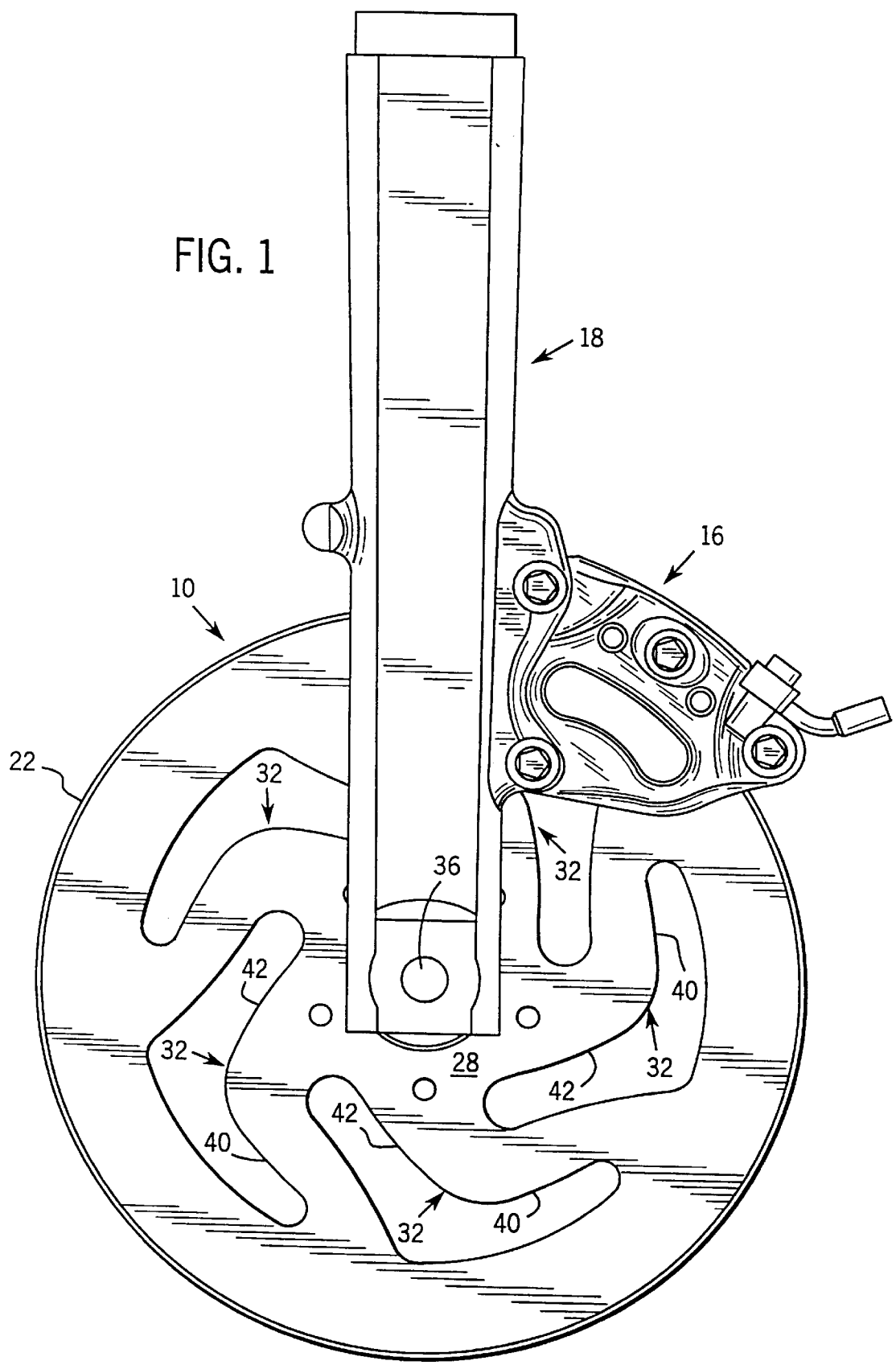
FIG. 1 is a side view of a brake disk mounted on the fork of the motorcycle with a brake caliper assembly mounted on the fork in a position to engage the outer perimeter of the brake disk.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 4:
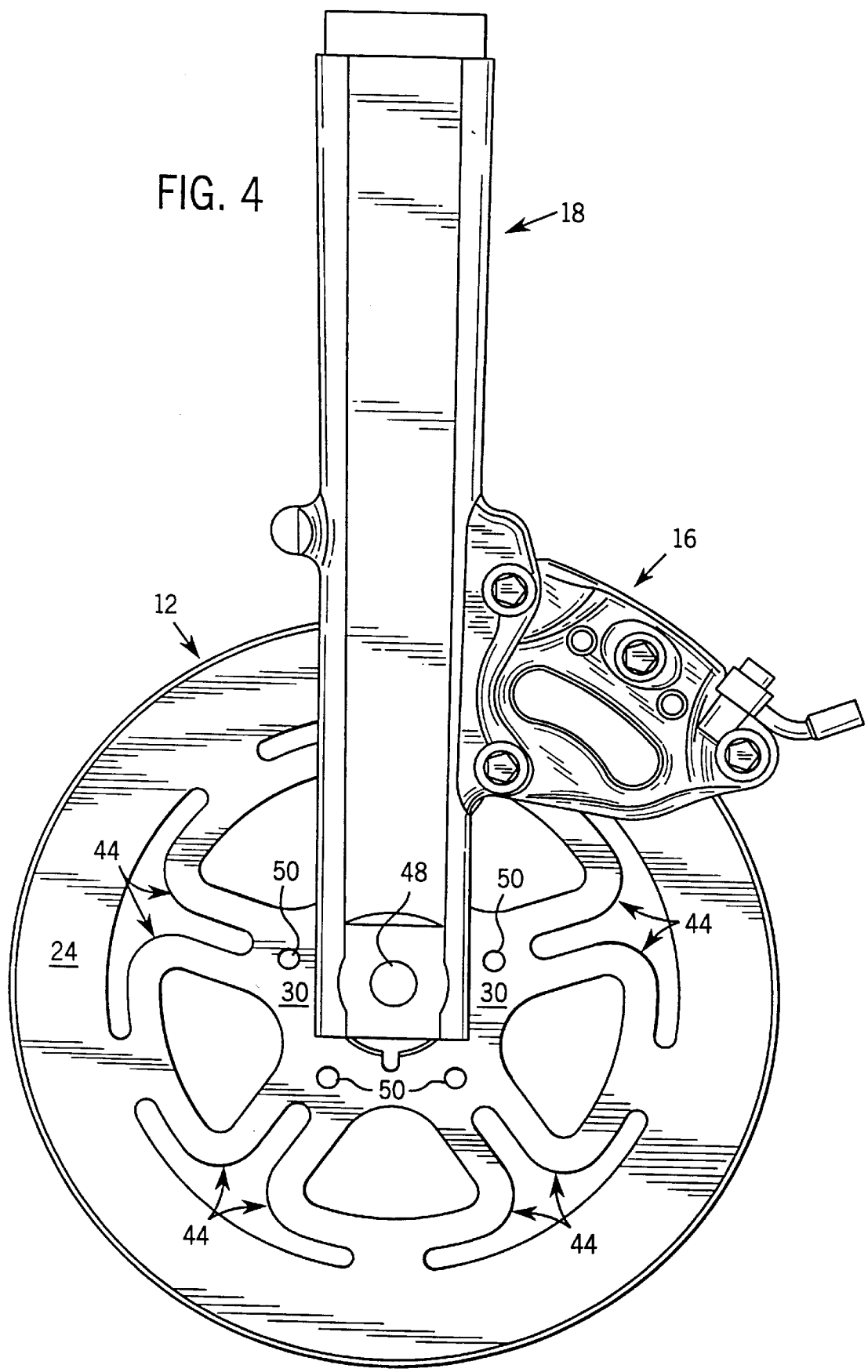
FIG. 4 is a view similar to FIG. 1 showing a brake disk mounted on the fork with a brake caliper mounted on the fork in a position to engage the outer rim of the disk.

The brake disks 10 and 12 as shown in FIGS. 1 and 4 are mounted for rotation on a fork 18 of a motorcycle. The brake disks are designed to compensate for heat generated in the outer ring 22 or 24 of the disk 10 or 12, respectively. In this regard when a brake force is applied to the outer ring by the caliper assembly 16 the outer ring is heated by the frictional contact of the caliper assembly. As shown in FIGS. 1 and 4 the caliper assembly 16 is mounted on the fork 18 in a position to straddle the outer ring 22 or 24 of the disks 10 and 12. The heat generated in the ring 22 or 24 by the actuation of the brake caliper assembly 16 causes the ring 22 or 24 to expand with respect to the arms 32 or 34. The arms 32 or 34 are also heated radially inwardly thus compensating for changes in the temperature between the ring 22 or 24 and the hub 28 or 30, respectively.

Figure 2:
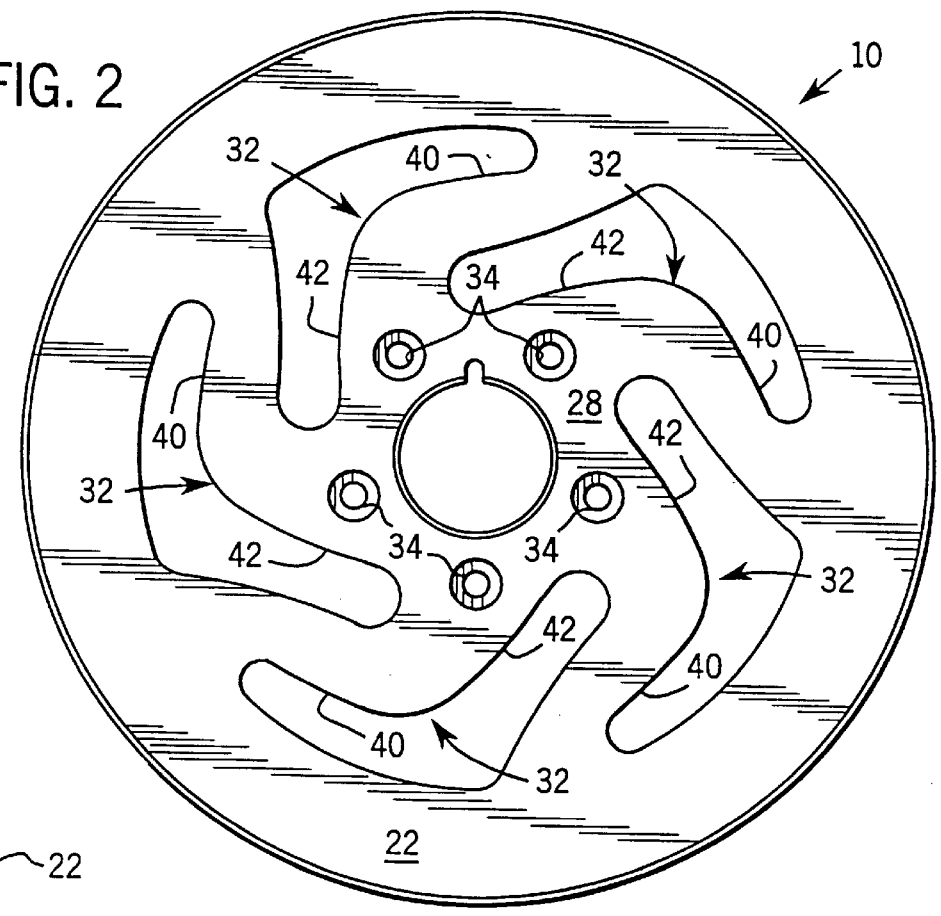
FIG. 2 is a side view of a brake disk having L-shaped radial arms interconnecting the outer rim of the disk with the inner rim of the disk which is mounted on the fork.
Figure 3:
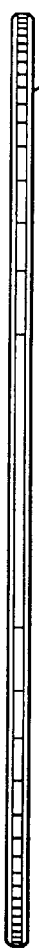
FIG. 3 is an end view of the disk.

In this regard and referring to FIGS. 1, 2 and 3, the disk 10 includes a number of arms 32 formed between the rim 22 and hub 28. The hub 28 is designed to be mounted on a wheel hub 36 and secured thereto by a number of bolts (not shown) mounted in openings 34. The arms 32 are in the form of L-shaped spokes 32, each having an arm section 40 and a base section 42. An outer radial end portion of each of the arms 32 1) extends from the second annular portion towards the first annular portion at an acute angle from a tangent to a circle circumscribing an inner edge of the second annular portion and 2) is enlarged relative to a radially intermediate portion of the arm. An inner radial end portion of each of the arms 32 1) extends from the first annular portion towards the second annular portion at an acute angle from a tangent to a circle circumscribing an outer edge of the first annular portion and 2) is enlarged relative to the radially intermediate portion of the arm. With this arrangement the arm sections 40 will expand radially outwardly with respect to the base section 42 as the heat generated in the outer rim 22 of the disk 10 migrates into the arm sections 40 thereby compensating for expansion and contraction of the rim 22.

Referring to FIGS. 4 through 7, an alternate form of disk 12 is shown which includes a number of symmetrical triangular arm sections 44 connected between the rim 24 and the hub 30. The hub 30 is designed to be mounted on the wheel hub 48 and secured thereto by a number of bolts (not shown) mounted in openings 50. The arm sections 44 as shown in FIGS. 5 and 7 are in the form of symmetrical triangles having a base 52 connected to the rim 24 and a pair of arms 54 connecting the base 52 to the hub 30. With this arrangement the heat generated in the outer rim 24 migrates into the sections 52 and 54 which expand radially.

Thus, it should be apparent that there has been provided in accordance with the present invention a brake disk that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A one piece brake disk for use in a vehicle braking system which includes a rotatable wheel hub, the one-piece disk comprising:

a first annular portion which has a plurality of holes formed therein and which is configured to be attached to the rotatable wheel hub by fasteners located, in part, within the holes;

a second annular portion formed from the one-piece disk and formed concentric with the first annular portion, the second annular portion including a first side including a first surface engageable by a first friction element during braking and a second side including a second surface engageable by a second friction element during braking, wherein the first annular portion is not engageable by the first and second friction elements; and a plurality of offset curved arms extending between the first and second annular portions from the one-piece disk to maintain an orientation between the first and second annular portions when the first and second annular portions are at a substantially similar temperature, wherein an outer radial end portion of each of the arms 1) extends from the second annular portion towards the first annular portion at an acute angle from a tangent to a circle circumscribing an inner edge of the second annular portion and 2) is enlarged relative to a radially intermediate portion of the arm, wherein an inner radial end portion of each of the arms 1) extends from the first annular portion towards the second annular portion at an acute angle from a tangent to a circle circumscribing an outer edge of the first annular portion and 2) is enlarged relative to the radially intermediate portion of the arm, and wherein a change in shape of the second annular portion in response to a change in temperature between the first and second annular portions causes the arms to deflect at least generally radially in relation to the first annular portion such that the second annular portion returns to the orientation when the first and second annular portions return to substantially the same temperature.

2. The one-piece disk of claim 1, wherein each arm has a first arm surface laying in a first plane and a second arm surface laying in a second plane, and the first surface lays in the first plane and the second surface lays in the second plane.

3. The one-piece disk of claim 1, wherein the arms are generally L-shaped.

4. The one-piece disk of claim 2, wherein the arms are generally L-shaped.

5. The one-piece disk of claim 3, wherein each arm has a first arm surface laying in a first plane and a second arm surface laying in a second plane, and the first surface lays in the first plane and the second surface lays in the second plane.

6. A one-piece disk for use in a vehicle braking system, the one-piece disk comprising:

a first annular portion including a plurality of holes therein and formed from the one-piece disk and being attachable to a rotatable wheel hub by fasteners located, in part, within the holes;

a second annular portion formed from the one-piece disk and formed concentric with the first annular portion, the second annular portion including a first side including a first surface engageable by a first friction element during braking and a second side including a second surface engageable by a second friction element during braking, wherein the first annular portion is not engageable by the first and second friction elements; and a plurality of equally spaced offset arms extending between the first and second annular portions from the one-piece disk to maintain an orientation between the first and second annular portions when the first and second annular portions are at a substantially similar temperature, each arm having a first arm surface and a second arm surface lying in a second plane, wherein an outer radial end portion of each of the arms 1) extends from the second annular portion towards the first annular portion at an acute angle from a tangent to a circle circumscribing an inner edge of the second annular portion and 2) is enlarged relative to a radially intermediate portion of the arm, wherein an inner radial end of each portion of the arms 1) extends from the first annular portion towards the second annular portion at an acute angle from a tangent to a circle circumscribing an outer edge of the first annular portion and 2) is enlarged relative to the radially intermediate portion of the arm, and wherein a change in shape of the second annular portion in response to a change in temperature between the first and second annular portions causes the arms to deflect at least generally radially in relation to the first annular portion such that the second annular portion returns to the orientation when the first and second annular portions return to substantially the same temperature.

7. The one-piece disk of claim 6, wherein the arms are formed to defined openings therebetween having generally triangular shapes.

8. A braking system for the front wheel of a two-wheeled vehicle of the type including a steering assembly which rotatable supports a rotatable wheel hub, the braking system comprising:

a brake caliper including first and second friction elements, and attached to the steering assembly; and a one-piece disk including a first annular portion including a plurality of holes therein and formed from the one-piece disk, the first annular portion being attachable to the rotatable wheel hub by fasteners located, in part, in the holes;

a second annular portion formed from the one-piece disk and formed concentric with the first annular portion, the second annular portion including a first side including a first surface engageable by the first friction element during braking and a second side including a second surface engageable by the second friction element during braking, wherein the first annular portion is not engageable by the first and second friction elements; and a plurality of offset arms extending between the first and second annular portions from the one-piece disk to maintain an orientation between the first and second annular portions when the first and second annular portions are at a substantially similar temperature, wherein an outer radial end portion of each of the arms 1) extends from the second annular portion towards the first annular portion at an acute angle from a tangent to a circle circumscribing an inner edge of the second annular portion and 2) is enlarged relative to a radially intermediate portion of the arm, wherein an inner radial end portion of each of the arms 1) extends from the first annular portion towards the second annular portion at an acute angle from a tangent to a circle circumscribing an outer edge of the first annular portion and 2) is enlarged relative to a radially intermediate portion of the arm, and wherein a change in shape of the second annular portion in response to a change in temperature between the first and second annular portions causes the arms to deflect at least generally radially in relation to the first annular portion such that the second annular portion returns to the orientation when the first and second annular portions return to substantially the same temperature.

9. The system of claim 8, wherein each arm has a first arm surface laying in a first plane and a second arm surface laying in a second plane, and the first surface lays in the first plane and the second surface lays in the second plane.

10. The system of claim 8, wherein the arms are generally L-shaped.

11. The system of claim 9, wherein the arms are generally L-shaped.

12. The system of claim 10, wherein each arm has a first arm surface laying in a first plane and a second arm surface laying in a second plane, and the first surface lays in the first plane and the second surface lays in the second plane.

13. The system of claim 8, wherein the steering assembly is configured as a fork including first and second elongated members.

* * * * *

UNITED STATES PATENT AND TRADEMARK OFFICE
CERTIFICATE OF CORRECTION

PATENT NO. : 5,848,674
DATED : December 15, 1998
INVENTOR(S) : Johnson et al.

It is certified that error appears in the above-identified patent and that said Letters Patent is hereby corrected as shown below:

Claim 6, line 44, after "surface" insert --lying in a first plane--.

Claim 7, line 66, after "to" delete "defined" and insert --define--.

Claim 8, line 3, delete "rotatable" and insert --rotatably--.

Signed and Sealed this

First Day of June, 1999

Attest:

Attesting Officer

Q. TODD DICKINSON

Acting Commissioner of Patents and Trademarks